3,357,806
PROCESS FOR PREPARING ALKALI METAL ALUMINUM HEXAHYDRIDES

Joseph J. Dvorak, Denville, and Robert Ehrlich, Morristown, N.J., assignors to Thiokol Chemical Corporation, Bristol, Pa., a corporation of Delaware
No Drawing. Filed June 2, 1964, Ser. No. 372,124
14 Claims. (Cl. 23—365)

This invention concerns the preparation of alkali metal aluminum hexahydrides.

More particularly this invention relates to an improved process for preparing alkali metal aluminum hexahydrides in good yield from readily available reactants.

The preparation of the above named novel group of metallic hydrides is described in copending Serial Number 351,590 filed Mar. 10, 1964 in the United States Patent Office. These novel compositions whose characterization is described in the above-designated patent application have utility among other things as selective reducing agents.

The present process for preparing the novel alkali metal aluminum hexahydrides is by the reaction of alkali metal alkyls with alkali metal aluminum hydrides. Unfortunately this process is not completely satisfactory in some respects. For example, yields are only fair and the size of the reaction run is necessarily limited by the volume of the easily inflammable dialkyl ethers used to solubilize the alkali metal aluminum hydride reactants. In addition, the product produced by the original process in some instances is difficult to filter. Since there is considerable interest in increasing the amount of product produced as well as yields, there is a need for alternative and improved preparation processes.

Thus, it is one object of this invention among others to disclose a novel process for preparing alkali metal aluminum hexahydrides in good yield and in a more readily handled form.

It is a further object of this invention to prepare the alkali metal aluminum hydrides in commercial quantities and without the need for hazardous reactants.

Other objects of this invention will become apparent to those skilled in the art upon a further reading of this application.

These objects and many others are achieved by the novel process described below.

In practice a trialkylamine alkane is contracted with an organo-alkali metal such as an alkali metal alkyl, preferably in the presence of inert solvent. The reaction is continued until substantial quantities of the hexahydride product is formed, at which time the reaction is halted and the product contained therein isolated. The main reaction course is believed to be:

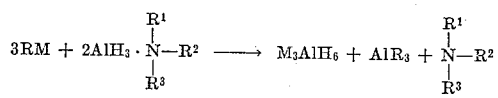

wherein R is an organic radical selected from the group consisting of alkyl and aryl radicals, R¹, R² and R³ which can be the same or different are selected from the group consisting of alkyl radicals, straight chain or branched chain, joined or conjoined, and M is an alkali metal selected from the group consisting of sodium, potassium and lithium.

The above reaction is balanced only in regard to the major product and by-product formed and does not take in consideration minor amounts of other reaction by-products or degradates.

Preferably the above reaction is conducted in the presence of an excess of inert solvent environment particularly aromatic solvent(s). Illustrative aromatic solvent(s) are benzene, toluene, the xylenes and the like. Less preferred solvent systems are aromatic ethers and mixtures of aromatic solvents with aliphatic ethers of aromatic ethers.

The reaction conditions of the inventive process offer a rather wide degree of latitude, insofar as temperatures, pressures, and reactants are concerned. For example, the reaction can be run between about 0° C. to 90° C. but the preferred temperature range is between 20–60° C. Ordinarily the reaction is conducted at near atmospheric pressures but if desired, higher pressures can be used. As indicated above, the stoichiometry of the complete reaction cannot be stated with certainty until all of the minor by-products have been characterized. However, it has been determined that a stoichiometric excess of the organo-alkali metal reactant assures superior yields. That is, from about 2–6 moles or more of the organo-alkali metal for each mole of the aluminum hydride trialkylaminate is preferred. Where the above ratio is substantially exceeded or reduced yields are somewhat diminished. Because of experimental differences in reactivity observed when different reactants are used no precise reaction time can be stated. However, under so called average reaction conditions the reaction is substantially complete between 3–48 hours with 10–24 hours being a more typical figure.

In the preferred procedure, the reaction is conducted in an appropriately sized reaction vessel equipped with a means of stirring, heating and cooling. Either reactant can be added first, there being no significance in the order of addition. The aluminum hydride trialkylaminates in the form of their aromatic solvent solutions are thoroughly mixed with the preferred lithium alkyl or lithium aryl. These are in the solid form or a solution of the organo-lithiums in a compatible inert solvent. Preferably, the temperature of the reaction mixture is raised until the inert solvent refluxes except in those instances where the reflux temperature exceeds 90° C. In these cases lower temperatures are maintained to avoid the possibility of decomposing the reactants. After the formation of the white precipitate of hexahydride product appears complete, the insoluble product is separated from the reaction mixture using the usual means such as centrifugation, decantation or filtration. A further purification from contaminents can be effected by washing the precipitate several times with small quantities of either solvent. The product can be dried at atmospheric pressure or dried under vacuum.

The reactants of the inventive process are either commercially avialable products or can be prepared without difficulty. For example, the orango-alkali metals such as the alkyl lithiums and aryl sodiums are well known compositions available in commercial quantities. Alternatively these compositions can be prepared according to methods set forth by Gilman in his exhaustive review entitled "Organometallic Compounds," chapter 5, pages 489–579 in the text Organic Chemistry volume I, second edition, 1944, published by John Wiley & Sons, Inc., New York.

The preparation of the aluminum hydride trialkylaminates is described in detail in copending Serial Number 278,802 filed in the United States Patent Office May 6, 1963.

Illustrative examples of the aluminum hydride trialkylaminate reactants which can be used include among many others, those aminats in which all three alkyl substituents on the nitrogen are alike including: aluminum hydride trimethylaminate, aluminum hydride triethylaminate, aluminum hydried tripropylaminate, aluminum hydride triisopropylaminate, aluminum hydride tributylaminate, the aluminum hydride tripentylaminates, the aluminum hydride triisopentylaminates, aluminum hydried trihexylaminate, the aluminum hydride triisohexylaminates and the aluminum hydride tricyclohexylaminate, as well as aminates in which one or more of the three alkyl substituents are unlike. The latter include aluminum hydride dimethylethylaminate, aluminum hydried methylethylpropylaminate and the like. While any or all of the above named aluminum hydride trialkylaminates or their equivalents can be used as reactants, the preferred trialkylaminates reactants are those compositions having the same straight chain alkyl groups substituents, said substituents having between 1–4 carbon atoms. These compounds are favored because of their ease of preparation and because of the superior yields produced when they are utilized as reactants.

Illustrative alkali metal alkyls include propyllithium, butyllithium, the pentyllithiums, the hexyllithiums, and the octyllithiums as well as the corresponding sodium and potassium compounds are among others. Typical alkali metal aryls include phenylsodium, phenyllithium, phenylethylsodium, phenylethyllithium and the corresponding potassium compounds.

The preferred aryl alkali metals are the phenylsodium and phenyllithiums which are the least expensive of the aryl compounds. The preferred alkyl alkali metals are the alkyllithiums and alkysodiums where the alkyl groups have 1–4 carbon atoms.

As indicated above, the inventive process is capable of many different embodiments.

One such embodiment can be seen in the preparation of sodium aluminum hexahydride from the reaction of butyl sodium and aluminum hydride trimethylaminate. In the preferred experiment a 4:1 molar ratio of the butyl sodium to aluminum hydride trimethylaminate in the presence of 100 parts by weight of anhydrous benzene are heated to 80° for 18 hours. At the end of this time the reaction is halted and the precipitated product filtered off and washed twice with 10 ml. portions of diethyl ether. The identity of the $Na_3AlH_6$ product can be established by infrared analysis.

A related embodiment is the preparation of potassium aluminum hexahydride. This product can be prepared by reacting butylpotassium with aluminum hydride triethylaminate at 80° C. for 16 hours. The butylpotassium is added in benzene solution and the molar ratio of reactants is 4 mols of the butylpotassium to 1 mol of the aluminum hydride triethylaminate. After the reaction is complete the $K_3AlH_6$ product is filtered, washed and characterized as before.

The novel process of this invention is advantageous in several respects compared to the process described in the copending application. For example, the alkali metal aluminum hydride products are produced in better yield free of contaminating byproducts. In addition, the use of ether solutions of the alkali metal aluminum hydride reactant is avoided. Not only were these solutions a potential fire hazard but they made it difficult to scale up to commercial type operations.

The following illustrative examples are submitted to show the preferred process embodiment, the preparation of lithium aluminum hexahydride, in greater detail.

*Example 1.—Preparation of lithium aluminum hexahydride*

To a stirred solution of 26.8 parts by weight of aluminum hydride trimethylaminate in 170 parts by weight of benzene is added 12.8 parts by weight of commercial n-butyllithium. The addition takes approximately 45 minutes. The reaction mixture is stirred overnight and the white precipitate which forms is filtered off. The precipitated product is washed several times with small portions of anhydrous diethyl ether and dried in a vacuum oven to yield the final dried product. The infrared spectrum and X-ray diffraction lines of the product corresponded to the product previously determined to be the $Li_3AlH_6$ product prepared by the original preparative process.

*Example 2.—Modification of the process to prepare lithium aluminum hexahydride*

To a stirred solution of 20 parts by weight of anhydrous diethyl ether is added 13.1 parts by weight of aluminum hydride triethylaminate in 85 parts by weight of benzene. Then 12.8 parts by weight of a commercial grade n-butyllithium is added over a ½-hour period. The reaction mixture is heated to 60° C. and the reaction mixture maintained at this temperature for 12 hours. At the end of this time the white precipitate is filtered off and washed with small portions of anhydrous diethyl ether. The dried product's infrared spectrum and X-ray diffraction analysis again agrees with the known sample of product.

*Examples 3–5.—Preparation of lithium aluminum hexahydride using other reactants*

Using the procedure described in Examples 1 and 2 the following reactant in the amounts specified are used to prepare sample of lithium aluminum hexahydride. The identity of the products are confirmed by both X-ray and infrared analysis.

| Ex. No. | Reactant 1 | Reactant 2 |
|---|---|---|
| 3 | Phenyllithium (2 moles) | Aluminum hydride trimethylaminate (1 mole). |
| 4 | Phenylethyllithium (2 moles). | Aluminum hydride tripropylaminate (1 mole). |
| 5 | Phenylpropyllithium (2 moles). | Aluminum hydride trimethylaminate (1 mole). |

As indicated by the above examples and description, numerous modifications and changes can be made in the reaction conditions and reactants without departing from the inventive concept. The inventions metes and bounds are best set forth in the claims which follow.

We claim:

1. A process for preparing an alkali metal aluminum hexahydride comprising contacting an organometallic reactant of the formula: RM, wherein R is a radical selected from the group consisting of alkyl and aryl radicals, and M is an alkali metal selected from the group consisting of sodium, potassium and lithium, with an aluminum hydride trialkylaminate reactant of the formula:

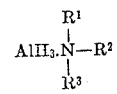

wherein $R^1$, $R^2$ and $R^3$ are alkyl radicals, until the alkali metal aluminum hexahydride is formed, and isolating the product contained therein.

2. The process of claim 1 wherein the reaction is carried out in inert aromatic solvent.

3. The process of claim 2 wherein the organometallic reactant is selected from the group consisting of alkyllithiums and aryl lithiums.

4. The process of claim 2 wherein the organometallic reactant is selected from the group consisting of alkylsodiums and arylsodiums.

5. The process of claim 2 wherein the organometallic reactant is selected from the group consisting of alkylpotassiums and arylpotassiums.

6. A process for preparing lithium aluminum hexahydride product comprising contacting organometallic reactants selected from the group consisting of lithium alkyls and lithium aryls, with an aluminum hydride trialkylaminate reactant of the formula:

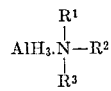

wherein $R^1$, $R^2$ and $R^3$ are alkyl radicals, having from 1–4 carbon atoms in the presence of inert solvent, at temperatures ranging between 0°–90° C., until the hexahydride product is formed and isolating the product contained therein.

7. The process of claim 6 wherein the reactants are butyllithium and aluminum hydride triethylaminate and the solvent is benzene.

8. The process of claim 6 wherein the reactants are phenyllithium and aluminum hydride triethylaminate and the solvent is benzene.

9. A process for preparing sodium aluminum hexahydride product comprising contacting organometallic reactants selected from the group consisting of sodium alkyls and sodium aryls, with an aluminum hydride trialkylaminate reactant of the formula:

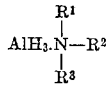

wherein $R^1$, $R^2$ and $R^3$ are alkyl radicals having from 1–4 carbon atoms, at temperatures ranging between 0°–90° C., in the presence of inert solvent, until the hexahydride product is formed and isolating the product contained therein.

10. The process of claim 9 wherein the reactants are butylsodium and aluminum hydride triethylaminate and the inert solvent is benzene.

11. The process of claim 9 wherein the reactants are phenylsodium and aluminum hydride triethylaminate and the inert solvent is benzene.

12. A process for preparing potassium aluminum hexahydride product comprising contacting organometallic reactants selected from the group consisting of potassium alkyls and potassium aryls, with an aluminum hydride trialkylaminate reactant of the formula:

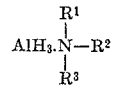

wherein $R^1$, $R^2$ and $R^3$ are alkyl radicals having from 1–4 carbon atoms, at temperatures ranging from 0°–90° C. in the presence of inert solvent, until the hexahydride product is formed and isolating the product contained therein.

13. A process of claim 12 wherein the reactants are butylpotassium and aluminum hydride triethylaminate and the inert solvent is benzene.

14. The process of claim 12 wherein the reactants are phenylpotassium and aluminum hydride triethylaminate and the inert solvent is benzene.

References Cited

Ruff et al., "Journal of the American Chemical Society," vol. 83, p. 535 (1961).

MILTON WEISSMAN, *Primary Examiner.*